US012649390B2

(12) United States Patent
Gehring et al.

(10) Patent No.: US 12,649,390 B2
(45) Date of Patent: Jun. 9, 2026

(54) METHOD FOR INTELLIGENT HEATING OF A FUEL CELL SYSTEM AND VEHICLE

(71) Applicant: Daimler Truck AG, Leinfelden Echterdingen (DE)

(72) Inventors: Ottmar Gehring, Magstadt (DE); Christof Bunz, Esslingen (DE); Luisa Langenbacher, Stuttgart (DE)

(73) Assignee: Daimler Truck AG, Leinfelden Echterdingen (DE)

( * ) Notice: Subject to any disclaimer, the term of this patent is extended or adjusted under 35 U.S.C. 154(b) by 286 days.

(21) Appl. No.: 18/686,162

(22) PCT Filed: Aug. 4, 2022

(86) PCT No.: PCT/EP2022/072031
§ 371 (c)(1),
(2) Date: Oct. 16, 2024

(87) PCT Pub. No.: WO2023/025567
PCT Pub. Date: Mar. 2, 2023

(65) Prior Publication Data
US 2024/0351480 A1      Oct. 24, 2024

(30) Foreign Application Priority Data
Aug. 23, 2021    (DE) ..................... 10 2021 004 310.3

(51) Int. Cl.
*B60L 58/40*          (2019.01)
*B60L 7/22*           (2006.01)
(Continued)

(52) U.S. Cl.
CPC ................. *B60L 58/40* (2019.02); *B60L 7/22* (2013.01); *B60L 50/75* (2019.02); *B60L 58/31* (2019.02);
(Continued)

(58) Field of Classification Search
CPC .......... B60L 58/40; B60L 58/31; B60L 58/34; B60L 58/12; B60L 7/22; B60L 50/75;
(Continued)

(56) References Cited

U.S. PATENT DOCUMENTS

| 2006/0046895 A1 | 3/2006 | Thacher et al. | |
| 2022/0194164 A1* | 6/2022 | Lutz ...................... | B60H 1/323 |
| 2024/0351479 A1* | 10/2024 | Gehring ................. | B60L 58/33 |

FOREIGN PATENT DOCUMENTS

| CN | 112721569 A | 4/2021 |
| DE | 4392959 B4 | 6/2005 |

(Continued)

OTHER PUBLICATIONS

International search report for PCT/EP2022/072031 mailed on Feb. 9, 2023.

*Primary Examiner* — Russell Frejd
(74) *Attorney, Agent, or Firm* — Dennemeyer & Associates LLC

(57)          ABSTRACT

The invention relates to a method for the intelligent heating of a fuel cell system (1), wherein a heat required for heating a fuel cell system (1) integrated in a vehicle (2) to an operating temperature is provided by a secondary brake system (3) of the vehicle (2) in the form of at least one retarder (3.1) and/or a brake chopper (3.2), The invention is characterized in that a planned journey is carried out with the vehicle (2), wherein the vehicle (2) switches from battery-electric operation to a fuel cell operating mode at a switchover time during the journey, in which a drive energy required to drive the vehicle (2) is provided by the fuel cell system (1), wherein an analysis of the planned journey is carried out before the start of the journey in order to determine an amount of heat which can be drawn from the secondary braking system (3) during a period of the journey, and wherein the switchover time is determined as a function (Continued)

Figure 1:
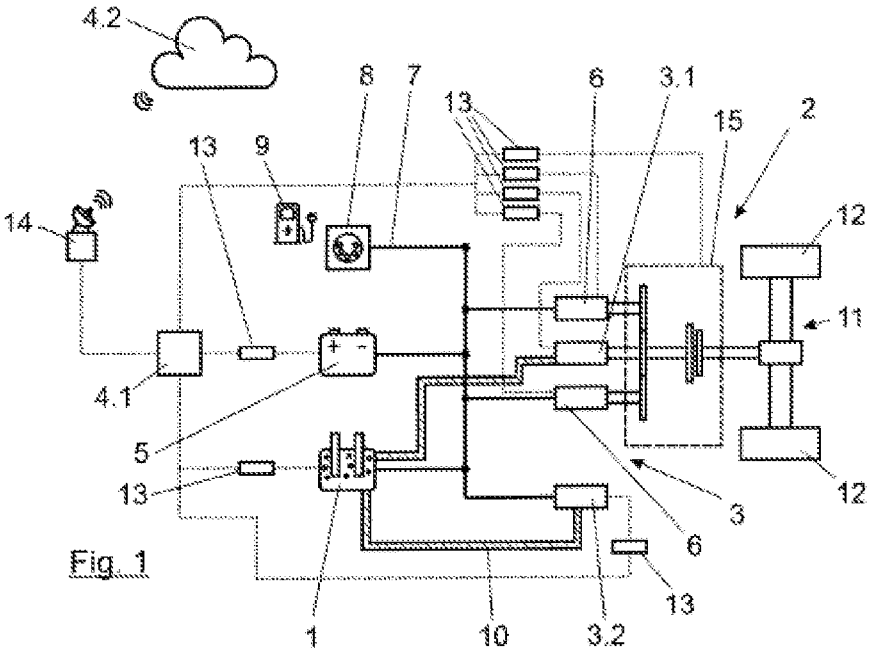

of the amount of heat which can be drawn and/or heating of the fuel cell system (1) is started before the start of the journey in order to ensure that the fuel cell system (1) has reached the operating temperature when the switchover time is reached.

10 Claims, 1 Drawing Sheet

(51) Int. Cl.
    *B60L 50/75*       (2019.01)
    *B60L 58/31*       (2019.01)
    *B60L 58/34*       (2019.01)

(52) U.S. Cl.
    CPC ........... *B60L 58/34* (2019.02); *B60L 2260/26* (2013.01); *B60L 2260/52* (2013.01); *B60L 2260/56* (2013.01)

(58) Field of Classification Search
    CPC ............. B60L 2260/26; B60L 2260/52; B60L 2260/56; B60L 7/10; B60L 2240/12; B60L 2240/62; B60L 2240/64; B60L 2260/20; B60L 2260/50; H01M 8/04992; H01M 8/04268; H01M 8/04302; H01M 8/04701; H01M 10/44; H01M 10/46; H01M 10/48; H01M 2220/20; H01M 2250/20; Y02E 60/50; G01C 21/3469; Y02T 90/40

See application file for complete search history.

(56) References Cited

FOREIGN PATENT DOCUMENTS

| | | |
|---|---|---|
| DE | 102020000314 A1 | 7/2021 |
| EP | 0842548 B1 | 8/1999 |
| JP | 2022142606 A | 9/2022 |
| JP | 2022155704 A | 10/2022 |
| WO | 2007064381 A2 | 6/2007 |
| WO | 2008147305 A1 | 12/2008 |

* cited by examiner

METHOD FOR INTELLIGENT HEATING OF A FUEL CELL SYSTEM AND VEHICLE

CROSS-REFERENCE TO RELATED APPLICATIONS

This is a 35 U.S.C. 371 National Stage Patent Application of International Application No. PCT/EP2022/072031, filed Aug. 4, 2022, which claims priority to German application 10 2021 004 310.3, filed Aug. 23, 2021, each of which is hereby incorporated by reference in its entirety.

The invention relates to a method for the intelligent heating of a fuel cell system of the type defined in more detail in the generic term of claim 1 and to a vehicle with such a fuel cell system.

Vehicles are increasingly being electrified for reasons of sustainability and environmental protection. Such vehicles typically have traction batteries and/or a fuel cell system to provide electrical drive energy. The energy carrier typically used by such a fuel cell system is hydrogen, which reacts with oxygen to form water. By storing a chemical energy carrier, greater ranges can be achieved than with a purely battery-electric drive.

To ensure that reaction processes can take place within the fuel cell system, it must be defrosted or warmed up to operating temperature before being put into use.

To heat a vehicle's fuel cell system to operating temperature, such a vehicle typically has a separate and comparatively powerful and therefore expensive heater. Integrating the heater into a vehicle's high-voltage electrical system also entails additional costs. The heat output that can be generated by such a heater is in the order of 10 KW, which means that the fuel cell system takes some time to warm up, especially in winter. It can therefore take several minutes before a corresponding vehicle can start its journey.

Furthermore, secondary braking systems for commercial vehicles are known from the prior art. A secondary braking system of this type can, for example, include a so-called retarder or brake chopper, which can be used to relieve the load on a primary braking system, such as a friction brake. This is the case, for example, when the vehicle has to be kept at a constant speed on a long journey along a slope.

A retarder is a hydrodynamic brake. When the retarder is engaged, shaft power is transferred from the vehicle's drive train to a rotor surrounded by fluid, which transmits a braking torque back to the drive train due to friction between the rotor and the fluid. To increase the braking effect, such a rotor typically has blades or vanes. The friction causes the liquid, for example water or oil, to heat up considerably.

A brake chopper is an electronic system for dissipating excess electrical energy. To brake a vehicle driven by an electric motor, the electric motor can be operated in a generator mode. This transfers a braking torque to the vehicle's drive train and also generates electricity. This electrical energy can be used to charge the vehicle's traction battery. Once the traction battery is fully charged, or if the electrical power generated by the generator exceeds the power that can be used to charge the traction battery, excess electrical power is converted into heat on resistors with the aid of the brake chopper.

The heat energy dissipated by a retarder and/or a brake chopper must be conducted away in order to prevent the respective component from overheating. For this purpose, the retarder or brake chopper is typically integrated into a vehicle cooling system.

Devices and methods for using waste heat dissipated by a retarder or brake chopper to heat vehicle components are known from the prior art. For example, DE 43 92 959 B4 discloses a vehicle with an internal combustion engine and a retarder in which the retarder is used to quickly heat the internal combustion engine to operating temperature. For this purpose, the internal combustion engine is started when the vehicle is stationary and used to drive the retarder. On the one hand, the internal combustion engine heats up faster due to the counter-torque exerted by the retarder, and on the other hand, the heat output dissipated by the retarder is used to additionally heat up the internal combustion engine. The advantage of heating up the internal combustion engine quickly is that it reaches its operating temperature faster, which reduces emissions. Once the internal combustion engine has reached its operating temperature, the retarder is automatically disconnected from the vehicle's drive train.

A similar method or a similar device is also known from WO 2007/064381 A2. The vehicle is hereby designed as a hybrid-electric or purely electrically powered heavy-duty commercial vehicle. Heat output dissipated by a brake chopper is used to preheat a vehicle engine or to air-condition a driver's cab. The current dissipated at the resistors is provided by a generator, which is driven by the vehicle's internal combustion engine, for example. The electricity can also be drawn from a traction battery in the vehicle or from an external energy source, such as a charging station connected to the vehicle via a power cable. In the case of a purely battery-powered vehicle, the electricity can also be generated by regenerative braking by operating the vehicle's drive unit in generator mode. The document also discloses the use of a fuel cell system to provide electrical energy.

A similar device for heating vehicle components is also known from WO 2008/147305 A1. The heat output from a brake chopper here is used to preheat or temper a fuel cell system and can be temporarily stored in a condenser if required.

The present invention is based on the object of specifying a method for the intelligent heating of a fuel cell system, with the help of which heat output provided by a secondary braking system of a vehicle is used to heat the fuel cell system to operating temperature, the method enabling particularly rapid, energy-efficient and thus sustainable heating of the fuel cell system.

According to the invention, this object is achieved by a method for the intelligent heating of a fuel cell system with the features of claim 1 and a vehicle with such a fuel cell system with the features of claim 7. Advantageous embodiments and further developments are apparent from the claims dependent thereon.

In a method for the intelligent heating of a fuel cell system of the type mentioned at the beginning, a planned journey is carried out with the vehicle in accordance with the invention, wherein the vehicle switches from battery-electric operation to a fuel cell operating mode at a switchover time during the journey, in which a drive energy required to drive the vehicle is provided by the fuel cell system, wherein an analysis of the planned journey is carried out before the start of the journey in order to determine an amount of heat which can be drawn from the secondary braking system during a period of the journey, and wherein the switchover time is determined as a function of the amount of heat which can be drawn and/or heating of the fuel cell system is started before the start of the journey in order to ensure that the fuel cell system has reached the operating temperature when the switchover time is reached.

Using the method according to the invention, it is possible to heat up the fuel cell system in a particularly sustainable and energy-efficient manner on the one hand, and to start a stationary vehicle particularly early on the other. By analyzing the journey, it is possible to determine when and with what power the secondary braking system can be operated and what amount of heat can be drawn from the secondary braking system. For example, a route from a starting point to a destination point is evaluated to determine sections of the route where the vehicle needs to brake. These include, for example, slopes, traffic lights, intersections, junctions and the like. At the switchover time, the system switches from battery-electric operation to fuel cell operating mode. This means that the fuel cell system must have reached its operating temperature when the switchover time is reached. If the amount of heat recovered by the secondary braking system is not sufficient to reach the operating temperature at the switchover time, the fuel cell system is heated up before the vehicle begins its journey. By analyzing the amount of heat that can be provided by the secondary braking system during the journey, it is possible to reduce the amount of heat required to preheat the fuel cell system before the journey begins. This means that, on the one hand, a particularly high proportion of regenerative energy generated by braking the vehicle can be used to heat up the fuel cell system. On the other hand, the time required to preheat the fuel cell system when the vehicle is stationary is reduced, allowing the vehicle to be started and to depart more quickly. It is thereby also possible to move the switchover time forwards or backwards in order to use less or more of the heat dissipated by the secondary braking system to heat the fuel cell system while the vehicle is in motion.

For example, if the vehicle starts from a comparatively high starting position such as a parking lot in the Alps and drives to a low-lying destination, such as a port by the sea, it is possible to obtain all the heat required to heat the fuel cell system to operating temperature from the secondary braking system, which enables the vehicle to be started immediately without first heating the fuel cell system while stationary.

Since the secondary braking system, which is already part of the vehicle, is used to heat the fuel cell system, there is no need for an additional and costly heating system. The vehicle can therefore be designed more simply, and manufacturing costs can be reduced. A corresponding secondary braking system comprises at least one retarder and/or at least one brake chopper, which is/are integrated into a cooling circuit of the vehicle. The cooling circuit in turn comprises pipes, pumps, valves, heat exchangers and the like, which are used to supply heat generated by the secondary braking system to the fuel cell system for heating.

The fuel cell system is also heated up when stationary via the secondary braking system, i.e., the retarder and/or the brake chopper. In this way, electrical energy can either be dissipated to resistors as heat and/or mechanical power can be generated by an electric drive machine in the form of shaft power, which is used to drive the retarder. Since such a retarder has a typical braking power in the order of several hundred kilowatts, it is also possible to heat up the fuel cell system even faster than when using a separate electric heater.

An advantageous further development of the method is that the journey is analyzed on a computing unit inside or outside the vehicle. For example, the vehicle can include a navigation system in which a person using the vehicle programs the planned journey. Subsequently, the navigation system or a computer communicating with the navigation system can evaluate the journey and determine the amount of heat that can be drawn from the secondary braking system. It is also possible for the journey to be analyzed on a computing unit outside the vehicle. The computing unit outside the vehicle can, for example, be formed by a cloud server from a service provider. The service provider is, for example, a vehicle manufacturer. For this purpose, there is a wireless communication link between the vehicle and the computing unit outside the vehicle. Communication can take place via mobile radio, WiFi, Bluetooth, NFC or the like.

Analyzing the journey on the computing unit outside the vehicle has the advantage that powerful hardware components can be used, which enables the journey to be analyzed very quickly. In addition, journeys to be made by a fleet of vehicles can be analyzed, as a result of which the computing unit outside the vehicle can access a comparatively large data set. It is hereby also generally possible for the vehicles to use sensors to record the amount of heat actually generated by the secondary braking system during the journey and assign it to a corresponding section of the route. As a result, the accuracy with which the amount of heat that can be generated during the journey is estimated can be improved.

According to a further advantageous embodiment of the method, at least part of the energy recuperated by the brake chopper during a braking process of the vehicle is used to charge a traction battery of the vehicle. This means that it is possible both to heat the fuel cell system during braking and to provide electrical energy to charge the traction battery. This increases the flexibility for determining the switchover time at which the system switches from battery-electric operation to fuel cell operating mode.

A further advantageous embodiment of the method also provides for the fuel cell system to be heated when the vehicle is stationary, taking into account the current or future charge level of the traction battery. Depending on the charge level of the traction battery, the vehicle may need to switch from pure battery-electric operation to fuel cell operating mode earlier or later. If the traction battery is exhausted, the fuel cell system must have reached its operating temperature in order to be able to provide the energy required to power the vehicle's electric drive unit. If, for example, only a relatively low residual capacity of the traction battery is available after the start of the journey, the switchover time is relatively early, which means that the fuel cell system must also have reached its operating temperature relatively soon after the start of the journey. This means that a large proportion of the heat required to heat the fuel cell system to operating temperature must be generated when the vehicle is stationary. The heating process for the fuel cell system is thereby started early enough to enable the vehicle to depart from the starting point at a scheduled starting time or to ensure that this can be adhered to. This means that schedules can be met particularly reliably.

In particular, the charge level of the traction battery and the heating of the fuel cell system are coordinated in such a way that the switchover time from battery-electric operation to fuel cell operating mode takes place when the charge level of the traction battery is exhausted or has reached a critical minimum value. As a result, any charging times of the vehicle at a charging station can be shortened during the standstill period, allowing the vehicle to depart even faster.

If the traction battery is fully charged or charged above a critical value before the start of the journey, it is also conceivable to heat up the fuel cell system during the journey using the retarder and additionally draw power from the traction battery and to heat up the fuel cell system by means of the brake chopper.

If the vehicle's route along a relatively long stretch of road does not require braking, the secondary braking system cannot be used to generate heat from regenerative sources to heat up the fuel cell system. However, the brake chopper can be supplied with energy from the traction battery, which enables the fuel cell system to be heated up while driving without braking. This makes it possible to further reduce the heat-up time of the fuel cell system before starting the journey, which means that cycle times with the vehicle can be observed even more time-efficiently. Furthermore, this prevents the fuel cell system from not being heated up to its operating temperature when driving along a route where relatively little braking is required if the fuel cell system could not be preheated sufficiently when the vehicle was stationary, for example due to time constraints.

According to a further advantageous embodiment of the invention, in addition to an evaluation of a planned route and a corresponding route profile, the analysis of the journey also takes into account any idle times of the vehicle. Such idle times result, for example, from breaks taken by a person driving the vehicle, refueling stops, loading stops or even loading and/or unloading the vehicle, for example at a depot along the route. Depending on the length of time the vehicle is stationary, the fuel cell system may cool down to below operating temperature. Accordingly, an amount of heat must again be supplied to the fuel cell system for it to reach operating temperature. Taking into account the idle times, this reduces the risk that the fuel cell system cannot be warmed up to operating temperature. Similarly, this makes it possible to achieve a specific charge level of the traction battery at the end of an idle time, which means that the switchover time following the idle time can be flexibly moved forward or backward.

It is preferred that the energy required for energy conversion with the secondary braking system is obtained from an energy source inside and/or outside the vehicle. The vehicle's internal energy source can be, for example, the traction battery, a solar module, a wind turbine, a condenser, a generator or the like. The vehicle's external energy source can be, for example, a public or private electricity network. The energy can be provided in the form of electrical energy in order to generate heat by means of the brake chopper and/or the energy can be mechanical energy in order to generate heat by means of the retarder. In general, it is also conceivable that, in addition to an electric motor, the vehicle also has an internal combustion engine with the help of which shaft power can be generated to drive the retarder. In principle, it is also possible for the vehicle to draw wired electricity from the private or public electricity network via a charging station, for example, and use this electricity to charge the traction battery and generate heat using the brake chopper. An electric motor of the vehicle can also be driven to generate mechanical energy to operate the retarder.

In the case of a vehicle having a fuel cell system, a secondary braking system and a computing unit, the fuel cell system, the secondary braking system and the computing unit are set up according to the invention to carry out a method as described above. The vehicle can be any road or rail vehicle. The secondary braking system comprises at least one retarder and/or one brake chopper. The computing unit can, for example, be a central on-board computer, a control unit of a vehicle subsystem, a telematics unit or the like. The computing unit is able to analyze the planned journey with the vehicle and control the secondary braking system in such a way that heat generated by the secondary braking system is used to heat up the fuel cell system. For this purpose, the fuel cell system and the secondary braking system are integrated into a common cooling circuit of the vehicle.

An advantageous further development of the vehicle provides for this being designed as a commercial vehicle. Commercial vehicles typically have relatively large dimensions and a comparatively high permissible payload. Furthermore, commercial vehicles typically have to cover long distances. For these reasons, commercial vehicles are particularly suitable for the provision of a fuel cell system to supply electrical drive energy. A process described above for the intelligent heating of such a fuel cell system can therefore be used particularly profitably in commercial vehicles.

The vehicle is preferably designed as a truck, van or bus.

According to a particularly advantageous embodiment of the vehicle, it can be controlled at least partially automatically. This also makes it possible to use a method according to the invention for fully autonomous trucks that are operated in a so-called hub-to-hub mode, for example.

Further advantageous embodiments of the method according to the invention for intelligently heating the fuel cell system result from the exemplary embodiments, which are described in more detail below with reference to the figures.

Figure 2:
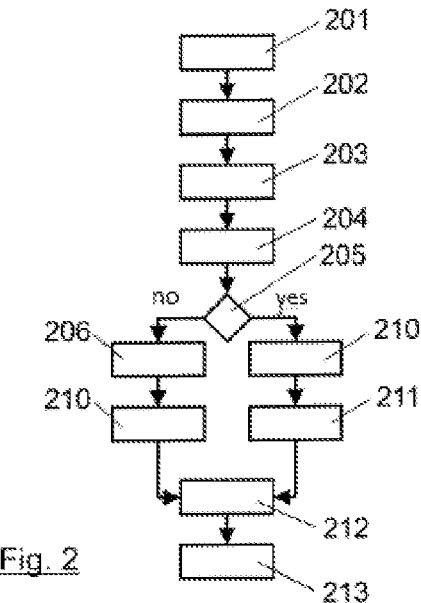

In the drawings:

FIG. 1 shows a simplified schematic representation of a vehicle according to the invention; and FIG. 2 a flow chart of a method according to the invention.

FIG. 1 shows a highly simplified representation of a vehicle 2 according to the invention, in this case in the form of a truck. The vehicle 2 has an electric drive train 11 with two electric motors 6. The electric motors 6 can be operated in a generator mode to brake the vehicle 2. The electric motors 6 are connected to a high-voltage network 7 and can receive energy via this from a traction battery 5 and/or a fuel cell system 1, in particular in the form of a PEM fuel cell, in order to supply them with electrical drive energy. Furthermore, the vehicle 2 has a charging interface 8 via which the vehicle 2 can obtain energy from a charging station 9.

The fuel cell system 1 must be heated to the correct operating temperature for correct and energy-efficient operation. The amount of heat required for this is provided by a secondary braking system 3 of the vehicle 2. The secondary braking system 3 comprises at least one retarder 3.1 and/or at least one brake chopper 3.2. The retarder 3.1 and the brake chopper 3.2 are integrated into a common cooling circuit 10, to which the fuel cell system 1 is also connected. Similarly, other vehicle components such as the traction battery 5 and/or the electric motors 6 can be connected to the cooling circuit 10 (not shown). Furthermore, other additional components such as pipes, pumps, valves, heat exchangers and the like are not shown.

In order to heat up the fuel cell system 1, electricity is dissipated at resistors of the brake chopper 3.2 into heat, which is transferred to a coolant flowing through the cooling circuit 10. Additionally, or alternatively, the cooling circuit 10 and thus the fuel cell system 1 can also be heated via the retarder 3.1. For this purpose, the retarder 3.1 taps shaft power from the drive train 11 of the vehicle 2, causing an impeller or blade wheel surrounded by fluid to rotate. The fluid heats up due to friction between the impeller or blade wheel and the fluid surrounding the wheel. The waste heat generated in this process is also transferred to the cooling circuit 10. The retarder 3.1 can be operated while the vehicle 2 is moving or when stationary. When stationary, the wheels 12 of the vehicle 2 are decoupled from an operative connection to the electric motors 6 and the torque generated by the electric motors 6 is fed into the retarder 3.1. Corresponding shifting processes take place within a transmission, for example in the form of a so-called E-axis 15.

To control the warm-up process of the fuel cell system 1, the vehicle 2 also comprises a central, internal computing unit 4.1, which is connected to vehicle subsystems via individual control units 13. Furthermore, the vehicle 2 has a communication interface 14 via which the vehicle 2 exchanges data with a computing unit 4.2 outside the vehicle, in this case in the form of a back end or a cloud.

A process sequence of a method according to the invention is illustrated in FIG. 2. In a method step 201, an itinerary of a planned journey with the vehicle 2 is entered into the internal or external computing unit 4.1, 4.2. In addition to a route, the itinerary also includes scheduled departure, arrival and/or break times, as well as any other idle times of the vehicle 2.

The itinerary is evaluated in method step 202. By analyzing the planned driving route, sections of the route can be identified where vehicle 2 is likely to brake. By taking other driving parameters into account, such as the expected vehicle speed and braking distance, it is possible to estimate the amount of heat that can be generated by the secondary braking system 3 and used to heat the fuel cell system 1 to operating temperature.

In method step 203, which can generally also be carried out simultaneously or before method step 202, further vehicle parameters such as a charge level of the traction battery 5, a charging cable of a charging station 9 plugged into the charging interface 8, a tank capacity of a hydrogen tank not shown, a current temperature of the cooling circuit 10 and/or the fuel cell system 1 or the like are analyzed.

A switchover time for changing from a purely battery-electric operating mode of the vehicle 2 to a fuel cell operating mode during the journey to be made is determined in the method step 204. This switchover time is selected so that vehicle 2 can begin its journey in accordance with the itinerary in such a way that a predetermined schedule can be met as time-efficiently as possible while minimizing potential delays. This also includes the fastest possible departure of vehicle 2 from its starting point. In addition, the switchover time is selected in such a way that energy consumption for driving the vehicle is minimized as far as possible. For this purpose, an amount of energy required to heat up the fuel cell system 1 must be taken into account in addition to the pure drive energy.

Furthermore, the switchover time can be determined in such a way that the costs incurred for making the journey are minimized. If, for example, electricity can be obtained at a particularly favorable rate via the charging station 9, the traction battery 5 is charged as fully as possible and the fuel cell system 1 is warmed up before departure by means of the secondary braking system 3 while the vehicle 2 is stationary, in accordance with the schedule to be met. If, on the other hand, the electricity available from the charging station 9 is relatively expensive, the fuel cell system 1 is preferably heated up during the journey. Heating up the fuel cell system 1 while driving also has the advantage that the vehicle 2 can depart in good time.

In method step 205, a check is made as to whether sufficient heat can be provided by the secondary braking system 3 during the journey in order to heat the fuel cell system 1 to the operating temperature when the switchover time is reached. If this is not the case, preheating of the fuel cell system 1 is begun in method step 206. The journey with vehicle 2 begins in method step 210. If the journey is begun before the fuel cell system 1 has warmed up, heating of the fuel cell system 1 is begun in method step 211.

In method step 212, the fuel cell system 1 reaches its operating temperature, whereupon a switchover is made to the fuel cell operating mode in method step 213 in accordance with the switchover time.

By analyzing the planned journey or the itinerary and the vehicle parameters such as the current charge status of the traction battery 5, it is possible for the vehicle 2 to depart very early, as the fuel cell system 1 can also be heated up to operating temperature during the journey. The idle time of the vehicle 2 can also be further reduced by charging the traction battery 5 only to the extent that the traction battery 5 is empty or has reached a critical state of charge when the switchover time is reached. In addition, the switchover time is determined in such a way that the amount of heat required to warm up the fuel cell system 1 is obtained in a particularly sustainable and therefore environmentally friendly way. This means that costs can be reduced. The secondary braking system 3, which is already in place, is used to generate heat, eliminating the need for a costly separate heating system.

The invention claimed is:

1. Method for the intelligent heating of a fuel cell system (1), wherein a heat required for heating a fuel cell system (1) integrated in a vehicle (2) to an operating temperature is provided by a secondary brake system (3) of the vehicle (2) in the form of at least one retarder (3.1) and/or a brake chopper (3.2), characterized in that a planned journey is carried out with the vehicle (2), wherein the vehicle (2) switches from battery-electric operation to a fuel cell operating mode at a switchover time during the journey, in which a drive energy required to drive the vehicle (2) is provided by the fuel cell system (1), wherein an analysis of the planned journey is carried out before the start of the journey in order to determine an amount of heat which can be drawn from the secondary braking system (3) during a period of the journey, and wherein the switchover time is determined as a function of the amount of heat which can be drawn and/or heating of the fuel cell system (1) is started before the start of the journey in order to ensure that the fuel cell system (1) has reached the operating temperature when the switchover time is reached.

2. Method according to claim 1, characterized in that the journey is analyzed on a vehicle-internal computing unit (4.1) or a computing unit outside the vehicle (4.2).

3. Method according to claim 1, characterized in that at least part of the energy recuperated by the brake chopper (3.2) during a braking operation of the vehicle (2) is used to charge a traction battery (5) of the vehicle (2).

4. Method according to claim 1, characterized in that the fuel cell system (2) is heated when the vehicle (2) is stationary, taking into account the current or future charge level of the traction battery (5).

5. Method according to claim 1, characterized in that in addition to an evaluation of a planned route and a corresponding route profile, the analysis of the journey also takes into account any idle times of the vehicle (2).

6. Method according to claim 1, characterized in that energy required for energy conversion with the secondary braking system (3) is obtained from an energy source inside and/or outside the vehicle.

7. Vehicle (2) with a fuel cell system (1), a secondary braking system (3) and a computing unit (4.1), characterized in that the fuel cell system (1), the secondary braking system (3) and the computing unit (4.1) are set up to carry out a method according to claim 1.

8. Vehicle (2) according to claim 7, characterized by a design as a commercial vehicle.

9. Vehicle (2) according to claim 8, characterized by a design as a truck, van or omnibus.

10. Vehicle (2) according to claim 7, characterized by an at least partially automated control system.

\* \* \* \* \*